May 21, 1940.　　　G. V. ELTGROTH　　　2,201,764
TUBE TESTER
Filed March 30, 1938
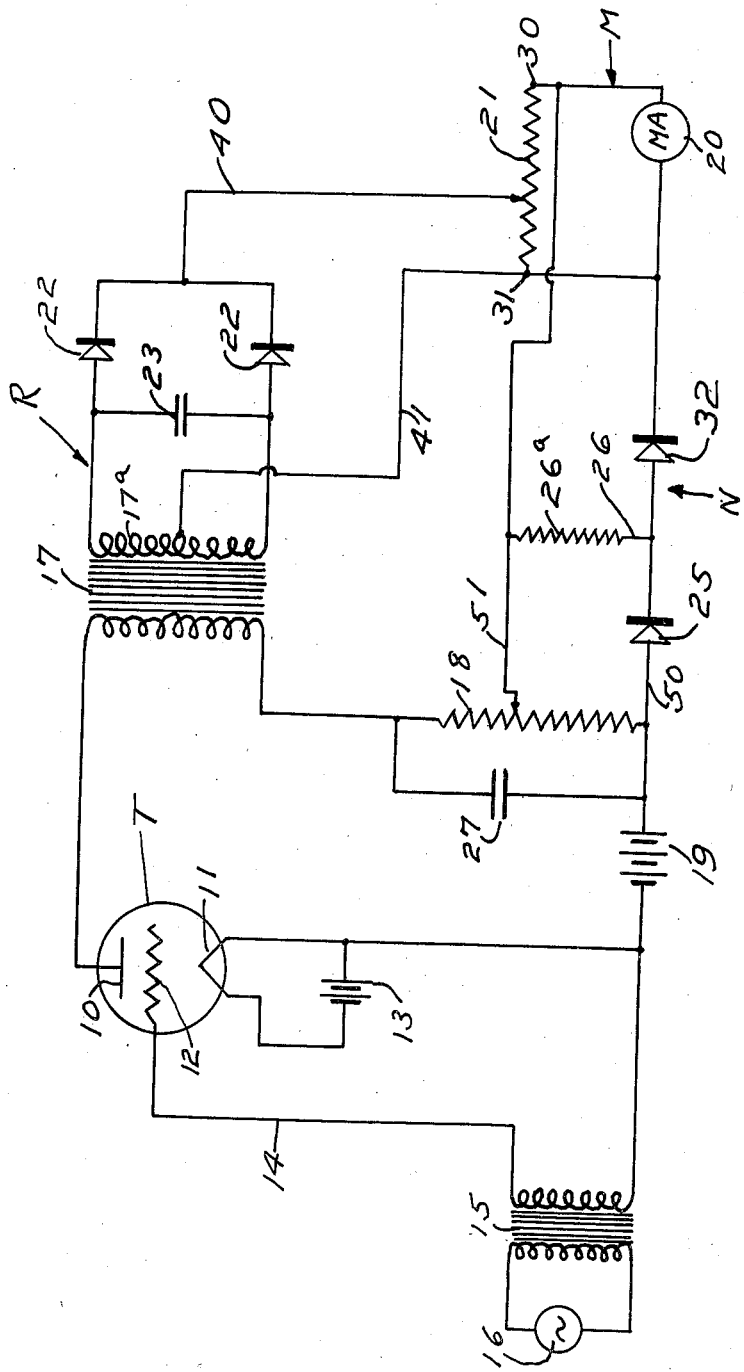
INVENTOR.
GEORGE V. ELTGROTH
BY
McConkey Dawson & Booth
ATTORNEYS Patented May 21, 1940

2,201,764

UNITED STATES PATENT OFFICE 2,201,764

TUBE TESTER

George V. Eltgroth, Chicago, Ill., assignor to Bendix Radio Corporation, Chicago, Ill., a corporation of Delaware Application March 30, 1938, Serial No. 198,877

9 Claims. (Cl. 250—27)

This invention relates to a tube tester, and deals particularly with apparatus for indicating the quality of space discharge tubes as determined by their mutual conductance and the amount of space current.

An object of the invention is to provide apparatus which will indicate at a single reading the quality of a tube as determined both by the mutual conductance and the amount of the space current. A further object is to provide apparatus which is very sensitive to space currents which are larger than the rated values for the type of tube being tested.

Two of the most important characteristics of a space discharge tube which determines its value in radio use are (1) the mutual conductance, which may be thought of as the ratio of the variation in space current to the variation of voltage at the control electrode, and (2) the amount of space current necessary to operate the tube. The first named characteristic, mutual conductance, is descriptive of the tube's ability to translate small variations at its input into substantial variations at the output, which is the functional purpose of the tube. The second named characteristic is descriptive of the amount of power which it is necessary to supply to operate the tube under test. It is necessary to take into consideration the amount of anode current necessary because though a certain tube has ample mutual conductance to perform its function in a radio circuit, if the tube draws an unnecessary amount of anode current at the voltage necessary for the anode, this represents a considerable loss of energy and may also result in damage to equipment with which the tube is associated. When the anode current of the tube rises above some value depending on the rating of the tube, the tube should not be regarded as serviceable regardless of the tube's mutual conductance, and it is an important object of this invention to provide apparatus which normally is affected primarily by the measurement of the tube's mutual conductance, but which when the anode current reaches a predetermined value will be extremely sensitive to such condition and will give an adverse indication of the tube's quality.

Other objects and advantages of the improved apparatus will become apparent as the specification proceeds. An embodiment of the invention is illustrated in the accompanying drawing in which the figure shown is a circuit diagram of the improved tester.

As illustrated, T designates the tube under test; M designates an indicating device; R designates a rectifier by which a measure of the tube's mutual conductance is impressed on the indicator M; and N designates a network sensitive to the amount of anode current and arranged to impress on the device M a potential determined by the amount of direct current in the anode circuit.

The tube T which is illustrated in the drawing, is a triode having the plate or anode 10, the filament or cathode 11, and the control grid 12. It is understood, however, that the improved testing apparatus may be used for testing other types of tubes having different numbers and arrangements of electrodes. The apparatus contemplates any suitable means for heating the cathode electrode, and such means may take the form of the battery 13 of a potential substantially the same as the potential normally applied for energizing the filament. Suitable connections to the electrodes of the tube under test are to be provided for simulating so far as is possible the actual operating conditions of the tube. The grid or control circuit 14 may include the secondary of the transformer 15, and the primary of this transformer may be provided with an alternator 16. Any suitable means for delivering electrical variations to the grid or control electrode of the tube may be here employed.

The plate or anode circuit of the tube under test includes the primary of the transformer 17, the resistor 18, and the suitable source of plate potential 19. Preferably the resistor 18 has a plurality of intermediate taps or an adjustable intermediate contact as well as end connections. Shunting the resistor 18 is the condenser 27 the purpose of which is to pass the varying component of the anode current around the resistor 18 so that such variations will not be impeded by the presence of this resistor.

The indicating device M comprises a milliammeter 20 which has connected to its terminals a resistor 21. It will be clear that the reading given by the milliammeter will be proportional to the total voltage appearing across the ends of resistor 21. In the present embodiment it is assumed that the meter 20 will give a positive or "good" reading when the positive polarity of the potential across resistor 21 appears at the resistor end 30.

The rectifier R involves a circuit which includes the secondary 17a of the transformer 17. The ends of winding 17a are each connected to the conductor 40 through a rectifying device 22, which device permits current flow only toward conductor 40. Any suitable rectifier may be used for devices 40; for example, these may be contact rectifiers of the copper-oxide type. Shunting the winding 17ª is the condenser 23 which with the winding 17ª forms a resonant circuit tuned to the frequency of the input variations impressed on the control electrode of the tube under test. The presence of the tuned circuit here produces more efficient operation of this part of the device and prevents the rectifying means being influenced by other than the frequencies impressed on the control electrode. A second conductor 41 is connected to the center tap of winding 17ª and with the conductor 40 delivers the output of the rectifier R to the indicating device M.

In the illustrated embodiment the conductor 41 is connected to the end 31 of the resistor 21, and the conductor 40 is connected to an intermediate tap or contact on this resistor. With this connection, it is seen that the output of the rectifier R delivered to the resistor 21 will create a potential across this resistor which is of positive polarity at the end 30, and which therefore, will cause the meter 20 to read positively.

The network N is preferably a multi-section network. Its conducting lines 50 and 51 are attached to the tube anode circuit at points which include between them at least a part of the resistance of the resistor 18. As here shown conductor 50 is connected to the positive side of resistor 18, and the conductor 51 is connected to one of the intermediate taps on this resistor. In series with the conductor 50 is a contact rectifier 25 which may be of the copper-oxide type, and beyond rectifier 25 is the shunt branch 26 extending between the conductors and including a resistance 26ª. Beyond branch 26, the conductor 50 includes another rectifier 32, and at its output end conductor 50 is connected to the end 31 of the resistor 21. The output end of the conductor 51 is connected to the end 30 of the resistor 21.

From the above it will be clear that the network N, as here shown, includes two sections each of which has one of rectifiers 25 or 32. The purpose of rectifiers 25 and 32 is to supply nonlinear impedances. It is a peculiar characteristic of contact rectifiers such as the copper-oxide type that their internal resistance changes very markedly upon only a small change of the applied voltage. This peculiar characteristic of contact rectifiers is here made use of to make the indicator M extremely sensitive to but small deviations of the plate current in the tube under test. The function of these non-linear impedances will become more fully apparent after the following explanation of the operation of the improved apparatus.

Upon insertion of the tube to be tested in the improved apparatus circuits will be completed and voltages supplied simulating the normal operating conditions of the tube. The current variations in the anode circuit which are due to the voltage variation on grid 12 pass through the primary of transformer 17 and through the condenser 27. Due to the condenser 27 these variations are not impeded by the presence of resistor 18, and therefore the presence of this resistor does not substantially change the alternating current output of the tube from what it would be under normal operating conditions. The variations in the primary of transformer 17 induce corresponding variations in the secondary of this transformer, and through the action of the rectifier R, such variations are translated into direct current impulses and these impressed on the resistor 21 of the indicating device. As was before explained, the polarity of the voltages thus impressed is such as to cause a positive deflection at meter 20.

Attention is now directed to the resistor 18 in the anode circuit of the tube. The direct current flowing in this anode circuit will cause a potential drop across this resistor, since the direct component of the current is blocked by the condenser 27. The conductor 51 is connected to the resistor 18 at such a point that the potential applied across conductors 50 and 51 is, with normal anode direct current flow, insufficient to pass a substantial amount of current through the rectifier 25, the resistance of such rectifier being high when such normal amount of direct current is flowing. Since in such condition, only a small amount of current can flow through the rectifier 25, there will be but a small potential across the ends of the shunt resistance 26ª, and only this small potential will be applied to the succeeding rectifier 32, and a still smaller current may pass through this succeeding rectifier. Thus, it will be clear that no appreciable current will flow through the resistor 21 at the output of this network, and the flow of normal plate current in the tube under test will not appreciably affect the reading of the meter. With normal plate current being drawn by the tube under test, it is seen that the indication obtained is a measure almost wholly of the mutual conductance of the tube.

Suppose, however, that the tube under test, though satisfactory from the standpoint of mutual conductance, does draw excessive plate current. It will be remembered that only slightly different plate current than the normal rated current may be considered excessive. In such case the voltage between the conductors 50 and 51 of the network N will have impressed on them by resistor 18 a slightly higher voltage than in the case of normal plate current. This slightly higher voltage will cause the rectifier 25 to pass much more current than before, causing a marked increase in the voltage across the shunt path 26, and also a marked increase in voltage applied to the rectifier 32. The marked increase in the voltage applied to the rectifiers 32 causes much exaggerated current to flow in the resistor 21. The direction of such current flow is such as to create a potential opposite in polarity to the potential applied by the rectifying means R and operates to overcome the potential due to the tube's mutual conductance, causing the meter to give a very low or negative reading which indicates an unserviceable tube.

The point of contact of conductor 51 on resistor 18 is adjustable so as to make the network particularly sensitive to deviations of plate current in certain desired ranges. This allows adjustment for the different types of tubes which have different normal plate current ratings. Also the point of attachment of conductor 40 on resistor 21 is adjustable along this resistor so that the relative influence of mutual conductance and plate current on the reading of the meter 20 may be changed as may be desired, or to accommodate different types of tubes.

I have found that it is quite an advantage to have the resistors 18 and 21 in close proximity to each other and have the movable contacts on these resistors mechanically associated. With this arrangement only one adjustment is generally needed to make the apparatus suitable for testing a larger or smaller tube. For example, when a tube of smaller capacity is to be tested, the movable contacts on resistors 21 and 18 may be moved at once, the contact on resistor 21 being moved toward the positive end 30 of resistor 21 and the contact on resistor 18 being moved toward the negative end of resistor 18 or toward the plate of the tube under test. This adjustment makes the meter more sensitive to the alternating component of the anode circuit and also makes the meter sensitive to a smaller direct current component of the anode circuit.

It is also desirable that the movable contacts on resistors 21 and 18 be adjustable with respect to each other, for by such adjustment the meter may be made sensitive to greater or lesser amounts of direct current in the anode circuit while remaining equally sensitive to the tube's mutual conductance.

While I have shown the network N as being composed of two sections, it is understood that this network may have only one or may have any number of sections as may be desired. By increasing the number of sections in this network, the discriminating ability of the apparatus as to the amount of plate current flowing is increased.

While only one embodiment of the invention has been shown, other embodiments may be constructed, and many changes may be made in the details of construction without departing from the spirit of the invention. The foregoing detailed description has been given for clearness of understanding only, and no unnecessary limitations should be understood therefrom, but the appended claims should be construed as broadly as permissible in view of the prior art.

What is claimed is:

1. In apparatus for testing space discharge tubes, a tube to be tested, a source of power for said tube, connections engaging electrodes of said tube to form a space discharge circuit, an indicating device sensitive to direct current potentials, a rectifier having its input coupled to said circuit and having its output impressed upon said device, and means responsive to the amount of direct current in said circuit for impressing a potential upon said device which increases with increase in said direct current in said circuit and which is opposite in polarity to the potential of said rectifier output.

2. In apparatus for testing space discharge tubes, a tube to be tested, a source of power for said tube, connections engaging electrodes of said tube to form a space discharge circuit, a control circuit, means for energizing said control circuit and said discharge circuit to simulate normal operating conditions of said tube, an indicating device sensitive to electrical potentials, and means energized from said discharge circuit for impressing upon said device a potential which is affected positively by higher values of mutual conductance of said tube and which is affected negatively by higher values of direct current in said discharge circuit.

3. In apparatus for testing space discharge tubes, a tube to be tested, a source of power for said tube, connections forming an anode-cathode circuit for said tube, an indicating device sensitive to electrical potentials, coupling means associated with said circuit for impressing upon said device a potential which is a measure of the mutual conductance of said tube, and an electrical network coupled at its one end with said anode circuit and at its other end to said device, said network including a nonlinear impedance and being adapted to impress on said device a potential opposite in polarity to said potential and of a value which is a non-linear function of the direct current in said circuit.

4. In apparatus for testing space discharge tubes, a tube to be tested, a source of power for said tube, connections forming a circuit including a pair of electrodes of said tube, an indicating device sensitive to electrical potentials, means associated with said circuit for impressing upon said device a potential corresponding with the variation of current in said circuit, a resistance in said circuit, an electrical network having its input terminals connected across said resistance and having its output terminals connected to said device, said network including a non-linear impedance and being adapted to impress on said device a potential opposite in polarity to said first potential and of a value which is a nonlinear function of the direct current in said circuit.

5. Apparatus as set forth in claim 4 in which said resistance is shunted by a capacitor for rendering the current variations in said circuit substantially unaffected by the presence of said resistance.

6. In apparatus for testing space discharge tubes, a tube to be tested, a source of power for said tube, connections forming a circuit including a pair of electrodes of said tube, an indicating device sensitive to electrical potentials, means associated with said circuit for impressing upon said device a potential corresponding with the variation of current in said circuit, a resistance in said circuit, and an electrical network having its input terminals connected across said resistance and having its output terminals connected to said device, said network including an impedance which has a lower value as the current passing through said resistance is increased whereby the output potential of said network is caused to vary more than in proportion to variation in the potential at its input, said network being so connected to said device that its output potential is opposite in polarity to the potential impressed by said means.

7. In apparatus for testing space discharge tubes, a tube to be tested, a source of power for said tube, connections forming a circuit including a pair of electrodes of said tube, an indicating device sensitive to electrical potentials, means associated with said circuit for impressing upon said device a potential corresponding with the variation of current in said circuit, a resistance in said circuit, and an electrical network having a plurality of sections each of which includes a nonlinear impedance, the input of said network being connected across said resistance and the output of said network being connected to said device in such sense as to impress upon said device a potential opposite in polarity to said potential, said impedance being nonlinear in such a sense as to create great changes in output potential upon but small changes in input potential.

8. In apparatus for testing space discharge tubes, a tube to be tested, a source of power for said tube, connections forming input and output circuits for said tube, means for supplying potentials in said circuits for simulating the normal operating conditions of said tube, an indicating device sensitive to direct current potentials, a rectifier having its input inductively coupled with said output circuit and having its output impressed upon said device, a resistance in said tube output circuit, a capacitor shunting said resistance, and a multi-section network having its input connected across said resistance and having its output impressed on said device, each section of said network having at least one branch which includes a nonlinear impedance which impedance is of a character such as to be reduced by higher potentials at the input of said network, the output of said network being connected to said device in such sense that the potentials impressed upon said device by said rectifier and said network are of opposite polarity.

9. In apparatus for testing space discharge tubes, a tube to be tested having an anode, cathode, and control electrode, a source of power for said tube, connections forming an anode-cathode circuit, means for applying to said control electrode a test alternating potential, said anode-cathode circuit including the primary of a transformer and a resistor which is shunted by a capacitor, an indicating device including a milliammeter connected across a mixing resistor, a rectifying circuit including the secondary of said transformer, the output terminals of said rectifying circuit being connected across at least a part of said mixing resistor in such sense that the voltage impressed produces a positive reading of said milliammeter, and a multi-section network having its input terminals connected across at least a part of said resistor and having its output terminals connected across said mixing resistor in such sense that the voltage thereby impressed produces a negative reading of said milliammeter, each section of said network having therein a nonlinear resistance of such character as to decrease in resistance upon increase of input voltage to the network.

GEORGE V. ELTGROTH.